Patented Nov. 15, 1949

2,487,820

UNITED STATES PATENT OFFICE 2,487,820

FLUORINATION OF FUSED-RING HYDRO-CARBONS WITH LEAD TETRAFLUORIDE

Earl T. McBee, La Fayette, Ind., and Richard M. Robb, Wilmington, Del., assignors to Purdue Research Foundation, La Fayette, Ind., a corporation of Indiana No Drawing. Application December 15, 1945, Serial No. 635,413

5 Claims. (Cl. 260—648)

This invention relates to organic compounds containing fluorine, particularly to fused-ring fluorohydrocarbons and to a method for the preparation thereof. This application is a continuation in part of applications Serial No. 552,016, filed August 30, 1944, Serial No. 568,939, filed December 19, 1944, and Serial No. 572,257, filed January 10, 1945.

The preparation of fluorine-containing fused-ring halohydrocarbons has, except in a few instances, not been accomplished heretofore. These compounds, due to their relatively high molecular weight, to their non-flammability, to their chemical stability, and to their wide liquid range, are of great value. Attempts to prepare these compounds using heretofore known general methods of fluorination, such as direct fluorination with elemental fluorine, the replacement of chlorine, bromine or iodine with fluorine using hydrogen fluoride or a metal fluoride, or the addition of hydrogen fluoride to carbon-carbon multiple bonds, have not led to satisfactory results. The need for a convenient procedure for the preparation of fused-ring fluorohydrocarbons is apparent.

It is an object of the present invention to provide a method for the preparation of fuse-ring fluorohydrocarbons, including fluorocarbons. An additional object is to provide an improved procedure for the preparation of fused-ring fluorohydrocarbons whereby the use of chlorinated, brominated, or iodinated intermediate compounds is not essential. An additional object is to provide a method for preparing fused-ring fluorohydrocarbons whereby the formation of undesirable decomposition of polymerization products is substantially avoided. An additional object is to provide a method for fluorinating fused-ring hydrocarbons whereby a predetermined degree of fluorination, including perfluorination, may be effected readily. An additional object is to provide a fluorination method for fused-ring hydrocarbons which is not subject to certain of the disadvantages set forth above. Still a further object is to provide a novel fluorinating agent capable of converting unsaturated fused-ring hydrocarbons into saturated fluorine-containing organic compounds and of replacing hydrogen in fused-ring hydrocarbons with fluorine. Still an additional object is to provide certain new and novel fluorine-containing organic compounds, including fused-ring fluorocarbons and other highly fluorinated products. Other objects will become apparent from the following specification and claims.

According to the present invention, the foregoing and related objects are accomplished readily and economically by contacting a fused-ring hydrocarbon with lead tetrafluoride under suitable reaction conditions until a desired degree of fluorination of the fused-ring hydrocarbon is effected. Lead tetrafluoride has been found to be an excellent fluorinating agent for fused-ring hydrocarbons and, when the fluorination reaction is carried out under conditions hereinafter described, the reaction can be controlled without difficulty. Substantially any desired proportion of the maximum theoretical amount of fluorine can be introduced into a fused-ring hydrocarbon molecule with the formation of little or no decomposition or polymerization products. Aromatic, heterocyclic and alicyclic fused-ring hydrocarbons can be converted readily to fluorine-containing compounds. Hydrogen in fused-ring hydrocarbons may be replaced with fluorine and unsaturated carbon-carbon bonds may be saturated by the addition thereto of fluorine atoms.

Fused-ring aromatic hydrocarbons such as anthracene, naphthalene, phenanthrene and their substitution derivatives, can be fluorinated readily with the addition of fluorine atoms at the points of unsaturation and, if desired, with the replacement of hydrogen in the molecule, and the production of saturated fluorine-containing compounds.

According to one modification of the present invention, perfluorination may be accomplished and perfluoro compounds may be obtained by contacting fused-ring hydrocarbons with lead tetrafluoride as an active fluorinating agent under such conditions and for such time that all hydrogen atoms in the molecule are replaced by fluorine atoms. In most instances, unsaturated carbon-carbon bonds in the molecule are saturated by the addition of fluorine during such perfluorination. Examples of such perfluoro compounds are perfluoronaphthalane, perfluoroanthracane, perfluorophenanthrane, perfluoroindane, and perfluoropinane.

Rupture of carbon-carbon bonds may be effected with the formation of fluorine-containing compounds having, in certain instances, fewer carbon atoms in the molecule than does the original fused-ring hydrocarbon fluorinated. This is herein referred to as fluorinolysis. Thus, for example, high molecular weight fused-ring hydrocarbons may be converted, under certain conditions, largely to high molecular weight fused-ring fluorohydrocarbons, to high molecular weight saturated fused-ring fluorocarbons, i. e., to saturated compounds containing only carbon and fluorine, or, under more vigorous reaction conditions to compounds having fewer carbon atoms in the molecule, such as hexafluoroethane and even carbon tetrafluoride, if desired.

Although the fluorination reaction is exothermic, it proceeds without explosive violence and may be controlled readily so as to produce a product containing substantially any desired proportion of fluorine. The fluorination reaction is carried out at a temperature between about 0° C., or somewhat lower, and about 500° C., or somewhat higher, perferably at a temperature between about 20° and about 450° C. Generally speaking, the addition of fluorine to a carbon-carbon unsaturated bond using lead tetrafluoride as the active fluorinating agent occurs at a somewhat lower temperature than does the replacement with fluorine of a hydrogen or halogen other than fluorine. This, however, is not always the case. It has also been observed that the optimum temperature for the introduction of a fluorine atom into an organic molecule increases somewhat as the number of fluorine atoms in the organic molecule is increased. It follows that the actual fluorination temperature employed will depend, to some extent, upon the organic compound fluorinated and the degree of fluorination desired.

During the course of the reaction, lead tetrafluoride used as a fluorinating agent is converted to lead difluoride from which lead tetrafluoride may be regenerated readily by exposing the difluoride to elemental fluorine at an elevated temperature. The reaction may thus be carried out in cyclical manner, the lead tetrafluoride being first contacted with a fused-ring hydrocarbon to produce the desired fluorine-containing organic compound and the spent lead tetrafluoride, consisting largely of lead difluoride, then regenerated with elemental fluorine and the cycle repeated. Furthermore, it may be desirable in some instances when a highly fluorinated product is desired, to effect only partial fluorination in the first passage through the reactor and then to recycle the fluorine-containing product over fresh or regenerated lead tetrafluoride to increase the proportion of fluorine in the organic molecule. Recycling of the fluorine-containing organic product as well as of the lead fluoride may, if desired, be continued until perfluorination is effected, the final product being substantially free of unsaturated carbon-carbon linkages and of hydrogen.

Lead tetrafluoride is a solid which is unstable in the presence of water or atmospheric moisture. The compound is substantially stable when dry at temperatures as high as 500° C. and higher. Lead tetrafluoride may be prepared readily in a number of ways, one convenient way being by the treatment of anhydrous lead difluoride with elemental fluorine at an elevated temperature, e. g., at temperatures above about 150° C., preferably at a temperature between about 250° and about 500° C. Lead difluoride may be prepared readily by treating anhydrous lead dichloride with hydrogen fluoride at temperatures above about 150° C., and in many other ways.

In practicing the invention, it has been found convenient to place anhydrous lead dichloride in the reaction vessel in which the subsequent fluorination of a fused-ring hydrocarbon is to be carried out, and then to treat the lead dichloride in the vessel first with hydrogen fluoride and then with elemental fluorine or with elemental fluorine alone, under the said requisite conditions of temperature. Following the fluorination of a fused-ring hydrocarbon the spent lead tetrafluoride, which contains a large proportion of lead difluoride, may be regenerated and the difluoride reconverted to the tetrafluoride by passing elemental fluorine over it at an elevated temperature. In this way the process may be carried out in cyclic manner, the lead fluoride being treated alternately with a fused-ring hydrocarbon and with elemental fluorine. Thus the consumption of lead salts in the process is reduced to a minimum and consists only of such negligible quantities as may be lost mechanically during the process.

Fluorination of a fused-ring hydrocarbon with lead tetrafluoride may be carried out in any convenient manner and in any convenient type of apparatus. It has been found satisfactory to dispose the lead tetrafluoride in a thin layer, e. g., in a layer from about one-half to about one inch thick, on shelves or trays within the reaction vessel or directly on the floor of the vessel itself and to pass a fused-ring hydrocarbon in vapor form through the vessel. The process is frequently carried out by distributing a shallow layer of lead tetrafluoride throughout the length of a metal tube and passing a fused-ring hydrocarbon in vapor form through the tube. If desired, tubes with rectangular cross section may be used and the exposed surface of the layer of lead tetrafluoride thus increased. The mass may be agitated if desired. The physical form of the lead tetrafluoride is preferably such that easy penetration of the mass of tetrafluoride by gases or vapors passing through the reaction vessel is facilitated. Granulated or coarsely powdered lead tetrafluoride has been found to be satisfactory.

The reaction vessel, which may be of iron, nickel or other material resistant to the reactants and reaction products under the conditions of fluorination and regeneration is maintained at the desired reaction temperature by any convenient means. Heating may be effected in any one of a number of ways, such as by electrical resistance heaters, by gas flames, or by immersing the reaction vessel in a suitable high-boiling liquid such as a low-melting alloy. The fluorination reaction is exothermic in nature and in large size reaction vessels heating may not be necessary after the reaction has started. In some instances cooling may even be advisable.

Fluorination of a fused-ring hydrocarbon with lead tetrafluoride may be carried out with the organic reactant in either liquid or gaseous phase. In practice, however, it has usually been found more convenient, especially when high temperatures are required, to pass a fused-ring hydrocarbon through the reactor in vapor form. In this way, handling of organic liquids at high temperatures is avoided and the reaction may be carried out at ordinary pressures. The organic reactant may be introduced into the reaction vessel either in the form of its vapor or as a liquid. In the latter instance, the organic reactant is usually vaporized in the portion of the reactor nearest the entry port and the vapors are then fluorinated as they pass through the remaining part of the vessel. In certain instances, a fused-ring hydrocarbon may be heated in a vessel separate from the fluorination vessel, a stream of inert gas, such as nitrogen, hydrogen fluoride, or helium, passed through the heated liquid, and the mixed vapors of inert gas and of fused-ring hydrocarbon then passed into the fluorination vessel. Fluorination with the fused-ring hydrocarbon in the vapor phase is conveniently carried out at atmospheric pressure although it may, if desired, be carried out at a pressure higher or lower than atmospheric pressure.

Although fluorination of a fused-ring hydrocarbon in the vapor phase using lead tetrafluoride as the active fluorinating agent is usually carried out at a temperature between about 0° C., and about 500° C., preferably between 20° C., and 450° C., it may be carried out at any convenient temperature above the condensing temperature of the vapors at the reaction pressure. In certain instances the temperature of fluorination may even be maintained sufficiently high to cause fluorinolysis. Temperatures sufficiently high to cause the formation of substantial amounts of undesirable by-products are to be avoided.

After the lead tetrafluoride has been largely exhausted and converted substantially to lead difluoride, the reactor may be purged with nitrogen or other inert gas to free it from most of the organic substances before elemental fluorine is admitted to the reaction vessel to regenerate lead tetrafluoride. In this way, the possible explosive reaction of residual organic vapor with elemental fluorine within the reaction vessel is avoided. Regeneration of the spent lead tetrafluoride is, as noted above, carried out at a temperature above about 150° C., preferably at a temperature between about 250° C., and about 500° C.

As mentioned previously, the process of the invention may, if desired, be carried out with the fused-ring hydrocarbon in the liquid phase in which case the hydrocarbon reactant and lead tetrafluoride may be mixed together in any convenient way, e. g., the fused-ring hydrocarbon may be stirred in a vessel at the desired temperature and lead tetrafluoride added gradually thereto. Such procedure with the fused-ring hydrocarbon in the liquid phase is of particular value when the hydrocarbon boils at a high temperature. It has been found that the ratio of the amount of lead tetrafluoride to the amount of fused-ring hydrocarbon necessary when a high degree of fluorination is to be effected is so great that when the reaction is carried out with the hydrocarbon in liquid phase the final reaction mixture is frequently of a moist, granular nature rather than of a fluid nature and is difficult to handle on a large scale. This difficulty may be overcome in a number of ways. Thus the liquid which is to be fluorinated may be diluted with a liquid inert under the reaction conditions, such as a high boiling fluorocarbon, to increase the proportion of liquid in the reaction mixture.

Alternatively, fluorination in the liquid phase may be carried out step-wise. Thus in the first step, the addition of solid lead tetrafluoride to the liquid fused-ring hydrocarbon may be stopped while the mixture is still fluid enough to be agitated readily. The reaction product may be filtered or otherwise treated to separate the organic and inorganic portions thereof, the spent lead tetrafluoride regenerated with fluorine, and the partially fluorinated organic portion then fluorinated further by adding to it fresh or regenerated lead tetrafluoride. Although the invention is not limited to vapor phase procedures, it is readily apparent that in many instances the fluorination reaction is more conveniently carried out in vapor phase.

The degree of fluorination effected is dependent, among other factors, upon the reaction temperature and the time of contact of the fused-ring hydrocarbon with lead tetrafluoride. In order to effect a high degree of fluorination, e. g., perfluorination of a fused-ring hydrocarbon in the vapor phase during a single pass through the reaction vessel, it may be necessary to pass the hydrocarbon vapor very slowly through the vessel thus limiting the rate at which a highly fluorinated product may be produced in any particular reaction vessel. It has also been found that some fused-ring hydrocarbons are somewhat more thermally unstable in the unfluorinated or only lowly fluorinated state than when they are more highly fluorinated and that, when it is attempted to fluorinate such unfluorinated or lowly fluorinated substances, to produce a highly fluorinated substance during a single pass of the vapor through the fluorination vessel, it may be necessary to elevate the temperature to such a degree that undesirable decomposition of the hydrocarbon reactant may occur before substantial fluorination is effected.

For these and other reasons, it is sometimes convenient and desirable to recycle the hydrocarbon reactant after it has been partially fluorinated, usually after the spent lead tetrafluoride has been regenerated to insure there being a high proportion of lead tetrafluoride in the lead fluoride mass. This recycling of the organic product may be repeated as many times as is desirable or necessary to introduce the desired proportion of fluorine into the molecule and each recycling is preferably, but not necessarily, carried out at a temperature higher than the preceding one. In this way the first stages of fluorination, which do not require high temperatures and during which relatively unstable organic compounds may be present in the fluorination vessel, are carried out at a relatively low temperature while later stages of fluorination, which usually require a higher temperature and during which only relatively stable fluorine-containing substances are present in the fluorination vessel, are carried out at a higher temperature. The same effect may be obtained by passing the fused-ring hydrocarbon through a number of reaction vessels or towers in series each containing lead tetrafluoride and each maintained at a reaction temperature which may, if desired, be higher than that of the preceding vessel. By a suitable arrangement of a number of reaction vessels in series, the process may be carried out continuously, it being only necessary to by-pass the vapors of the fused-ring hydrocarbon around any one of the reaction vessels while the spent lead tetrafluoride therein is being regenerated with fluorine.

It is to be noted that when the fluorination reaction involves the replacing of hydrogen with fluorine, the replaced hydrogen appears in the reaction product as hydrogen fluoride. When, however, the only reaction involved is the addition of fluorine to an unsaturated carbon-carbon bond, hydrogen fluoride or elemental halogen do not appear in the reaction product. The effluent vapors from the reaction may thus, depending upon the substance fluorinated, contain, in addition to the desired fluorine-containing organic compound, hydrogen fluoride together with unfluorinated or insufficiently fluorinated hydrocarbon reactant.

The reaction product may be treated in any convenient manner to recover therefrom the desired fluorination product. One convenient way in the case of vapor phase fluorination consists in cooling and condensing the effluent vapors and treating the condensed liquid to separate therefrom the organic fluorine-containing product. Fluorinated organic compounds are substantially immiscible with anhydrous hydrogen fluoride and, when a mixture of the vapors of such compounds and hydrogen fluoride are condensed, two liquid layers are usually apparent, one of which consists principally of anhydrous hydrogen fluoride and the other of which consists principally of fluorinated organic compounds. These layers may be separated and anhydrous hydrogen fluoride thus recovered as a valuable by-product. The layer of fluorinated organic compounds or, in case two layers are not apparent in the condensed product, the entire liquid reaction product may be treated in any one of a number of ways. Thus the liquid may be fractionally distilled and the desired fraction collected, or it may be treated directly with water and subsequently with a dilute aqueous alkali to free it from elemental halogen and acidic substances and then fractionally distilled. In any event, the desired fluorine-containing fraction may be collected and less highly fluorinated fractions may, if desired, be recycled to the fluorination reaction vessel to increase the proportion of fluorine in the fraction.

In the case of fluorination with a fused-ring hydrocarbon in the liquid state, the reaction mixture may be filtered or otherwise treated to separate the organic and inorganic constituents. The inorganic constituents, consisting mainly of spent lead tetrafluoride, may be dried or washed with a low boiling organic liquid and dried, and then regenerated with elemental fluorine and recycled in the process. The organic constituents may be washed with water and with dilute aqueous alkali to free them from acidic substances, and the mixture then fractionally distilled. Inert liquid diluents and insufficiently fluorinated organic substances collected during the distillation may be returned either together or separately to the fluorination vessel and the fluorine content of the insufficiently fluorinated portion increased by further treatment with fresh or regenerated lead tetrafluoride. Other ways of recovering the desired fluorination product from the reaction mixture will be apparent to those familiar with the art and the present invention is not limited as to such methods of recovery.

Certain advantages of the invention are apparent from the following examples, which are given by way of illustration only and are not to be construed as limiting.

*Example 1*

An iron tube fitted with means for heating at any desired temperature was packed loosely with several mols of lead dichloride. The tube and contents were heated at about 300° C. and anhydrous hydrogen fluoride passed through the tube for several hours. Elemental fluorine was then passed through the tube for several hours until the gases issuing from the tube contained a high proportion of fluorine. The lead dichloride in the tube was thus converted almost entirely to lead tetrafluoride. The lead tetrafluoride was used without removal from the tube in subsequent fluorination reactions.

*Example 2*

A reactor containing several mols of finely divided lead tetrafluoride is heated at a temperature of from 300° to 350° C. Naphthalene is heated in a vaporizing flask at a temperature slightly below its boiling point and nitrogen bubbled slowly through the heated liquid. The mixture of nitrogen and naphthalene vapors is passed directly into the fluorination reactor containing lead tetrafluoride. The effluent vapors from the reactor contain fluorinated naphthalene, nitrogen and hydrogen fluoride. The effluent vapors are cooled in a receiver surrounded with ice. After the naphthalene has also been vaporized, the stream of nitrogen is passed through the reactor for some time to sweep therefrom the last traces of organic product.

The spent lead tetrafluoride in the fluorination reactor is then regenerated by passing elemental fluorine through the reactor at a temperature of about 375° C. The crude fluorinated product collected in the receiver is washed with water, dried, and again passed through the fluorination reactor at a temperature of about 400° C. The recycling procedure is repeated until no further lowering of the refractive index of the washed and dried product is noted and until the final product obtained does not react with elemental fluorine. During each pass of the naphthalene product through the reactor, the proportion of fluorine in the product is increased. The final condensate, when washed with water, dried and fractionally distilled, contains a high proportion of perfluoro-naphthalene boiling at 136° to 138° C., having a density of 1.915 at 27° C., and a refractive index of 1.3100 at 27° C.

*Example 3*

Anthracene is fluorinated with lead-tetrafluoride substantially as by the method described in Example 2, the lead tetrafluoride in the fluorination reactor being maintained at a temperature of about 400° C. After several passes of the anthracene product through the reactor there is obtained a fluorinated product containing a substantial proportion of perfluoroanthracene. Fractions of less highly fluorinated anthracene are also isolated from the product.

*Example 4*

In a manner similar to that described in Example 2, tetrahydronaphthalene is fluorinated with lead tetrafluoride at a temperature of about 375° C. After several passes of the organic product through the fluorination reactor, a product is obtained which contains a substantial proportion of perfluoronaphthalane.

*Example 5*

In a manner similar to that described in Example 2, decahydronaphthalene is fluorinated with lead tetrafluoride at a temperature of about 350° to 400° C. In this manner there is obtained a product containing a mixture of fluorinated naphthalenes from which a substantial fraction of perfluoronaphthalane is isolated.

We claim:

1. The method for the fluorination of a fused-ring hydrocarbon to replace, with fluorine, hydrogen atoms attached to carbon in the fused-ring hydrocarbon and to saturate, with fluorine, carbon-carbon double bonds when present in the fused-ring hydrocarbon, with retention of the carbon skeleton of the starting fused-ring hydrocarbon, including the steps of (1) vaporizing the fused-ring hydrocarbon, (2) maintaining solid lead tetrafluoride in a reaction zone at a temperature above the boiling point of the fused-ring hydrocarbon and below about 500 degrees centrigrade, (3) causing the vapor of the fused-ring hydrocarbon and the lead tetrafluoride to react with replacement, with fluorine, of hydrogen atoms attached to carbon in the fused-ring hydrocarbon and with saturation, with fluorine, of double bonds when present in the fused-ring hydrocarbon, and (4) condensing from the effluent product a fluorinated fused-ring hydrocarbon having the carbon structure of the starting fused-ring hydrocarbon, wherein hydrogen has been replaced with fluorine, and wherein at least one double bond, when present in the starting fused-ring hydrocarbon, has been saturated with fluorine.

2. The process of claim 1, wherein the product from the reaction zone is recycled in the vapor phase into a reaction zone containing lead tetrafluoride at a temperature between about 300 and 500 degrees centigrade until all hydrogen in the fused-ring hydrocarbon has been replaced with fluorine and all double bonds present in the fused-ring hydrocarbon have been saturated with fluorine, and condensing from the product a saturated fused-ring fluorocarbon having the same carbon skeleton as the starting fused-ring hydrocarbon.

3. The process of claim 1, wherein the starting fused-ring hydrocarbon is naphthalene.

4. The process of claim 1, wherein the starting fused-ring hydrocarbon is anthracene.

5. The process of claim 1, wherein the starting fused-ring hydrocarbon is tetrahydronaphthalene.

EARL T. McBEE.
RICHARD M. ROBB.

REFERENCES CITED

The following references are of record in the file of this patent:

UNITED STATES PATENTS

| Number | Name | Date |
|---|---|---|
| 2,004,932 | Daudt et al. | June 18, 1935 |
| 2,013,035 | Daudt et al. | Sept. 13, 1935 |
| 2,024,008 | Midgley et al. | Dec. 10, 1935 |
| 2,062,743 | Daudt et al. | Dec. 1, 1936 |
| 2,192,143 | Midgley et al. | Feb. 27, 1940 |
| 2,220,713 | Grosse et al. | Nov. 5, 1940 |
| 2,238,242 | Balon et al. | Apr. 15, 1941 |
| 2,423,045 | Passino et al. | June 24, 1947 |
| 2,426,172 | Benning | Aug. 26, 1947 |

FOREIGN PATENTS

| Number | Country | Date |
|---|---|---|
| 3,141/31 | Australia | Jan. 20, 1933 |
| 214,293 | Great Britain | Apr. 14, 1924 |
| 429,591 | Great Britain | May 28, 1935 |
| 786,123 | France | June 3, 1935 |

OTHER REFERENCES

Henne et al., J. A. C. S., vol. 63, pages 3478–3479 (1941).

Dimroth et al., Ber. deutsch. Chem. Ges., vol. 64, pages 516–522 (1931).

Wartenberg, Zeitschr, anorg. allgem. Chem., vol. 244, pages 337–347 (1940).

Moissan, "Comptes rendus," vol. 130, pages 622–627 (1900).

Ruff and Giese, "Zeit. Anorg. Allgem. Chem.," vol. 219, pages 143 to 148 (1934).

Certificate of Correction

Patent No. 2,487,820            November 15, 1949

EARL T. McBEE ET AL.

It is hereby certified that error appears in the printed specification of the above numbered patent requiring correction as follows:

Column 8, line 29, for "perfluoro-naphthalene" read *perfluoronaphthalane*; line 41, for "perfluoroanthracene" read *perfluoroanthracane*; and that the said Letters Patent should be read as corrected above, so that the same may conform to the record of the case in the Patent Office.

Signed and sealed this 10th day of April, A. D. 1951.

[SEAL]

THOMAS F. MURPHY,
*Assistant Commissioner of Patents.*